(12) United States Patent
Rejndrup

(10) Patent No.: US 6,684,221 B1
(45) Date of Patent: Jan. 27, 2004

(54) UNIFORM HIERARCHICAL INFORMATION CLASSIFICATION AND MAPPING SYSTEM

(75) Inventor: Kim Rejndrup, Needham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/567,162

(22) Filed: May 8, 2000

Related U.S. Application Data (60) Provisional application No. 60/132,925, filed on May 6, 1999.

(51) Int. Cl.$^7$ ................................................. G06F 7/00
(52) U.S. Cl. .................................................. 707/104.1
(58) Field of Search .............................. 707/1–7, 9, 10, 707/100, 102, 104.1, 200, 203, 500, 513, 530–532; 704/1, 7, 9, 10; 435/4–6; 715/500, 513, 530–532

(56) References Cited

U.S. PATENT DOCUMENTS

| | | | | |
|---|---|---|---|---|
| 4,392,207 A | * | 7/1983 | Dockal | 710/64 |
| 4,825,869 A | * | 5/1989 | Sasmor et al. | 607/27 |
| 4,972,657 A | * | 11/1990 | McKee | 206/534 |
| 5,181,163 A | * | 1/1993 | Nakajima et al. | 704/10 |
| 5,201,048 A | * | 4/1993 | Coulter et al. | 707/104.1 |
| 5,299,123 A | * | 3/1994 | Wang et al. | 707/2 |
| 5,317,722 A | * | 5/1994 | Evans | 717/170 |
| 5,608,622 A | * | 3/1997 | Church | 704/3 |
| 5,764,975 A | * | 6/1998 | Taniguchi et al. | 707/1 |
| 5,838,313 A | * | 11/1998 | Hou et al. | 707/500.1 |
| 5,893,113 A | * | 4/1999 | McGrath et al. | 701/201 |
| 6,055,535 A | * | 4/2000 | Suzuoka et al. | 707/10 |
| 6,112,209 A | * | 8/2000 | Gusack | 707/101 |
| 6,122,539 A | * | 9/2000 | Figueira et al. | 324/307 |
| 6,142,371 A | * | 11/2000 | Oneda | 235/380 |
| 6,154,213 A | * | 11/2000 | Rennison et al. | 345/428 |
| 6,192,382 B1 | * | 2/2001 | Lafer et al. | 707/501.1 |
| 6,205,443 B1 | * | 3/2001 | Evans | 707/5 |
| 6,250,930 B1 | * | 6/2001 | Mintz | 434/118 |
| 6,292,811 B1 | * | 9/2001 | Clancey et al. | 705/30 |
| 6,327,589 B1 | * | 12/2001 | Blewett et al. | 704/9 |
| 6,327,593 B1 | * | 12/2001 | Goiffon | 707/102 |
| 6,329,196 B1 | * | 12/2001 | Johnson et al. | 435/299.1 |
| 6,360,223 B1 | * | 3/2002 | Ng et al. | 707/100 |
| 6,389,412 B1 | * | 5/2002 | Light | 707/3 |
| 6,405,204 B1 | * | 6/2002 | Baker et al. | 705/36 |

OTHER PUBLICATIONS

Price, Colin and Barrett, James, "Clinical Terms Quality Assurance",Br J Healthcare Comput Info Manage, Mar. 1999; 16(2): 44–8.*
Marketing Brochure, Oracle Corporation, "Providing the Solution for Clinical Data Management," Jun. 1, 1999.
Marketing Brochure, Oracle Corporations, "Oracle Thesaurus Management System Version 1.0," Jun. 1, 1999.
Rejndrup, K., Oracle Corporation, "Integrating with TMS, " Oct. 14, 1999.
Rejndrup, K., "Oracle TMS New Features," Jun. 1, 1999.
Rejndrup, K., "Training and Maintenance Presentation," Jun. 1, 1999.

* cited by examiner

Primary Examiner—Greta Robinson
Assistant Examiner—Harold E. Dodds, Jr.
(74) Attorney, Agent, or Firm—Hamilton, Brook, Smith & Reynolds, P.C.

(57) ABSTRACT

A system and method to access and update a thesaurus of clinical terms employed in conjunction with a clinical study can be used to classify and map the clinical terms to related terms. A study term extracted from raw clinical data is presented to determine a corresponding match in the thesaurus of clinical terms. A table of relations is maintained to associate each clinical term with one or more related clinical terms in the thesaurus. A clinical term is mapped to one or more derived terms as indicated by the relations. The derived terms are processed to select a preferred term from the derived terms. An omission manager is operable to find a near matching candidate term if the clinical term is not found in the thesaurus. A plurality of different clinical terms can therefore be classified as corresponding to a common clinical term as indicated by the relations.

65 Claims, 9 Drawing Sheets

| CONTENT TABLE | | |
|---|---|---|
| Level | ID | Term |
| 1 | 101 | Secondary Anemia |
| 1 | 102 | Aplastic Anemia |
| 1 | 103 | Sickle Cell Anemia |
| 2 | 104 | Secondary Anaemia |
| 2 | 105 | Primary Anaemia |
| 3 | 106 | Disorders of the Blood And Lymphatic System |

*FIG. 4a*

| RELATION TABLE | | | |
|---|---|---|---|
| Level | ID | Reference Level | Reference ID |
| 2 | 104 | 1 | 101 |
| 2 | 105 | 1 | 102 |
| 2 | 105 | 1 | 103 |
| 3 | 106 | 2 | 104 |
| 3 | 106 | 2 | 105 |

CONTENT TABLE ~20

| Level | ID | Timestamp | End Timestamp | Term |
|---|---|---|---|---|
| 1 | 101 | Day 1 | <Day+> | Secondary Anemia |
| 1 | 102 | Day 1 | Day 3 | Aplastic Anemia |
| 1 | 102 | Day 3 | <Day+> | Nonregenerative Anemia |
| 1 | 103 | Day 1 | <Day+> | Sickle Cell Anemia |
| 2 | 104 | Day 1 | <Day+> | Secondary Anaemia |
| 2 | 105 | Day 1 | <Day+> | Primary Anaemia |
| 3 | 106 | Day 1 | <Day+> | Disorders of the Blood and Lymphatic ... |

*FIG. 9a*

RELATION TABLE ~22

| Level | ID | Reference Level | Reference ID | Timestamp | End Timestamp |
|---|---|---|---|---|---|
| 3 | 106 | 2 | 104 | Day 1 | <Day+> |
| 3 | 106 | 2 | 105 | Day 1 | <Day+> |
| 2 | 104 | 1 | 101 | Day 1 | <Day+> |
| 2 | 105 | 1 | 102 | Day 1 | Day 3 |
| 2 | 104 | 1 | 102 | Day 3 | <Day+> |
| 2 | 105 | 1 | 103 | Day 1 | <Day+> |

UNIFORM HIERARCHICAL INFORMATION CLASSIFICATION AND MAPPING SYSTEM

RELATED APPLICATION

This application claims the benefit under 35 U.S.C. § 119(e) of U.S. provisional patent application No. 60/132,925, filed May 6, 1999, entitled "Thesaurus Management System," the entire teachings of which are incorporated herein by reference.

BACKGROUND

In many industries, a variety of terms are used as labels for products, parts, ingredients, procedures, milestones, and other labels commonly used in the industry or within a particular company. Often, such terms are applied inconsistently, either from subtle permutations, the use of a more specific or more general term, and errors. The use of a thesaurus of terms can be beneficial in the determination of equivalent and related terms. Such a thesaurus can be queried to find an equivalent term so that consistent term usage can be applied across the industry or company.

For example, clinical studies are often undertaken during preparation of a new consumer product. Such studies are used to determine adverse effects, effectiveness, marketability, duration, and other aspects of the new product. In the health and pharmaceutical industries, clinical studies are often mandated and scrutinized by Federal and state governmental regulations prior to the release of a new pharmaceutical or medical product. Typically, a large quantity of clinical data is generated by such studies. The clinical data is provided from a number of different sources involved with the study. The source of the data may be from human test subjects, physician reports, drug dispensary logs, laboratory test results, and other sources. The clinical data is then entered and analyzed, typically from a text format.

Often, inconsistent terminology is used to refer to the same clinical term. Different permutations, prefixes, suffixes, and generalities may be used by different sources of the clinical data. Further, the data entry process is prone to errors such as typographical and spelling errors. Therefore, the same clinical term may appear in a variety of formats throughout the clinical data produced by the study. The time required to classify the inconsistent terms and allow proper analysis can be significant, therefore delaying the study and consequentially, the release of the new product. The cost associated with such a delay can be substantial.

SUMMARY

Terms associated with a particular domain often define a hierarchy of relations between the terms. Different terms may be related as equivalents, or as more general or more specific indications. For example, in a domain such as a manufacturing operation, each part may be comprised a number of other parts. These, in turn, also each include component parts. In this manner, a hierarchy of terms is established from the finished product as the most general to the raw components as the most specific.

A thesaurus of terms employed in an industry, enterprise, or company allows terms common to the industry, enterprise, or company to associate terms with other related or equivalent terms. Associations between the terms are organized in a hierarchy. Such associations indicate relations between the terms, including more general terms, more specific terms, and equivalent terms. By querying the hierarchy of terms, a particular term can be classified to another term. Such classification facilitates consistent term usage throughout the various contexts in which the term is employed. These contexts may include research reports, product literature, marketing literature, technical specifications, and corporate policies.

In one embodiment, a system and method provide for accessing and updating a thesaurus database of clinical terms employed in conjunction with a clinical study. The system and method classify the terms derived from raw clinical data to effect a consistent clinical term classification throughout the clinical study.

A study term can be extracted from raw clinical data and presented to determine a corresponding match in the thesaurus database of clinical terms.

A table of relations can be maintained to associate each clinical term with one or more related, or derived, clinical terms in the thesaurus. A clinical term can then be mapped to one or more derived terms as indicated by the relations. The derived terms can be further processed to select a preferred term from the derived terms. A set of rules can be defined to indicate the relations which are allowed, such as one-to-many and many-ro-many. The relations are verified against the set of rules prior to activation in the thesaurus database.

An omission manager can be operated to find a near matching candidate term if the clinical term is not found in the thesaurus database. A plurality of different clinical terms can therefore be classified as corresponding to a common clinical term as indicated by the relations.

Subsequent processing and analysis of clinical data can be facilitated by reference to the common clinical term rather than requiring consideration of all of the plurality of clinical terms. Further, a database state can be associated with the clinical terms and relations. The database state indicates a discrete point which can be recreated on demand to accommodate successive database changes such as revisions of terms and vendor dictionaries. In one embodiment, a timestamp value is associated with the clinical terms and the relations to accommodate periodic updates and changes to the terms and relations.

In this manner, a unified thesaurus database model can be used to represent an arbitrary hierarchy of related terms.

BRIEF DESCRIPTION OF THE DRAWINGS

The foregoing and other objects, features and advantages will be apparent from the following more particular description of embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Typically a classification and mapping system is used for classifying and mapping raw clinical data provided from a clinical study as described above. Alternatively, the system is employed to classify and map terms applicable to a hierarchical structure, such as part descriptions, enterprise organizational charts, and problem resolution mapping.

Figure 1:
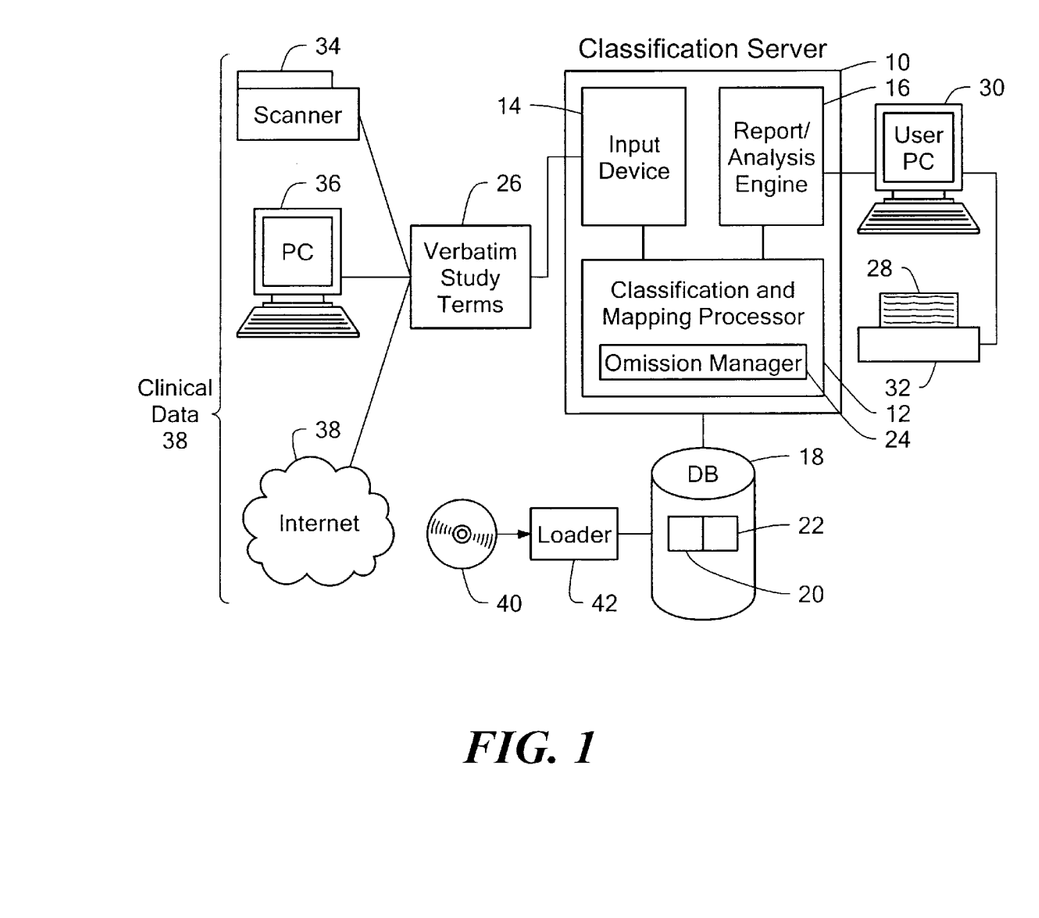
FIG. 1 is a block diagram of a classification and mapping system.

FIG. 1 shows a block diagram of the classification and mapping system as defined herein. A classification server 10 has a classification and mapping processor 12, an input device 14, and a report/analysis engine 16. The classification and mapping processor 12 is in communication with a thesaurus database 18, which stores the clinical terms and relations. The thesaurus database 18 includes a content table 20 and a relation table 22. The content table 20 stores the clinical terms and the relation table 22 stores the relations defining associations between the clinical terms. The classification and mapping processor 12 also includes an omission manager 24 for resolving terms not found to match the clinical terms in the content table 20.

In a typical study, verbatim study terms 26 are extracted from raw clinical data by a variety of methods, and provided to the input device 14. The classification and mapping processor 12 receives the verbatim study terms 26 as match terms from the input device 14, and attempts to classify the match terms according to corresponding clinical terms in the thesaurus database 18, as described further below. The clinical terms are initially transmitted to the thesaurus database 18 from an external media source, such as a CD-ROM 40, from a loader 42. The classification results are sent to the report/analysis engine 16, where an output report is produced from the classification results. The output report 28 is sent to the user PC 30, where it may be printed via the attached printer 32. Alternatively, the output report 28 is received by an application running on the user PC 30 for further processing by any suitable method, such as correlation with previous reports, sorting, or statistical analysis.

The verbatim study terms 26 are provided from clinical data 38 by any suitable method, including the scanner 34 from hardcopy data reports, the PC 36 from a data entry or other suitable application, or a public access network such as the Internet 38 via an HTML browser or other format. The raw, unprocessed clinical data 38 is then interrogated for verbatim study terms 26 to provide to the input device 14 for classification. In a particular embodiment, the raw, unprocessed clinical data 38 is received by a clinical study data management application executing on the PC 36, such as ORACLE® CLINICAL, commercially available from Oracle Corporation of Redwood Shores, Calif.

In a clinical study, the clinical terms are stored in the thesaurus database 18. In a typical study, the thesaurus database 18 may, for example, include 200 k clinical terms in the content table 20 and 400 k relations in the relation table 22. As indicated above, an external media source is often employed to populate the initial thesaurus database 18. Typically, external media sources are purchased in the form of a dictionary on CD-ROM 40 from an external vendor. Common vendor-supplied dictionaries include WHO-Drug (World Health Organization Drug Dictionary) by the World Health Organization, COSTART (Coding Symbols for a Thesaurus of Adverse Reaction Terms) by the Drug Information Association, and CPT (Current Procedural Terminology) by the American Medical Association. Other vendors and dictionaries are common and known in the industry.

Figure 2:
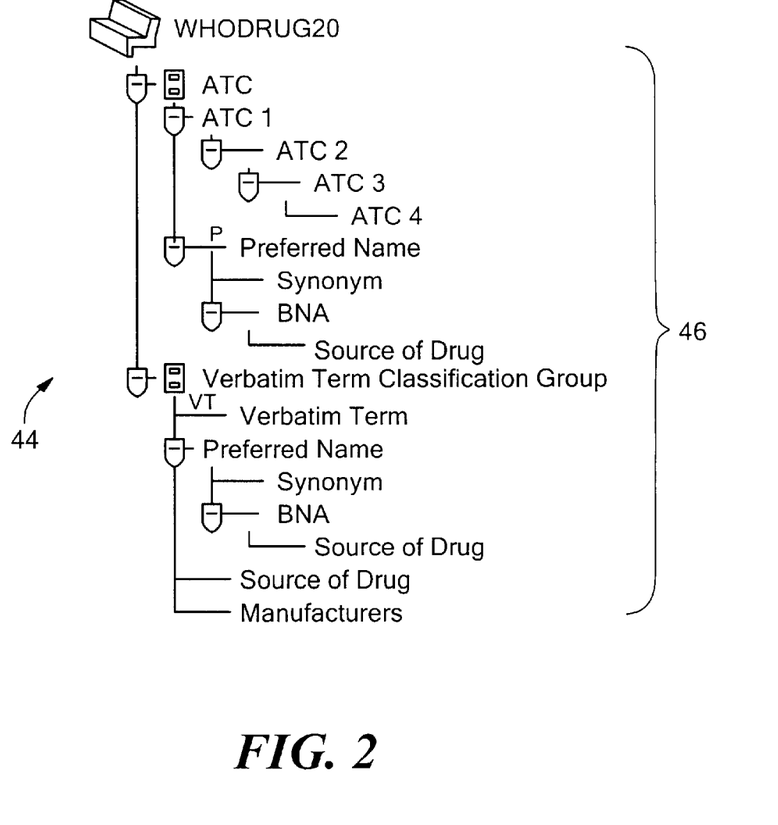
FIG. 2 is a schematic diagram of the structure of an external dictionary of terms.

FIG. 1 shows the various entities that interact with the classification and mapping system, and FIG. 2 shows the structure of a vendor-supplied dictionary used with such a system. Referring to FIGS. 1 and 2, the hierarchical structure of the WHO-Drug dictionary 44 is shown. Clinical terms are read from the CD-ROM 40 and stored in the content table 20. Relations between the clinical terms also read and stored in the relation table 22 to define relations between terms on different levels 46, as defined by the hierarchy. In this manner, both the content and the hierarchical structure of the dictionary 44 are transmitted to the thesaurus database 18 via the loader 42 and stored in the content table 20 and the relation table 22.

Figure 3A:
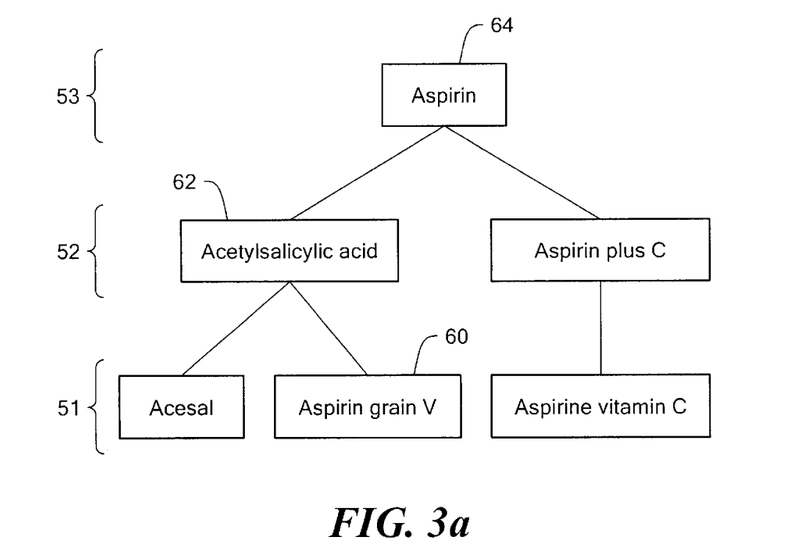
FIGS. 3a and 3b are block diagrams of a hierarchical relation and mapping of terms.

FIG. 3a shows an example of a hierarchy of terms. Referring to FIG. 3a, at the first level 51, a plurality of clinical terms which refer to various types of aspirin are shown. For example, a particular study term extracted from a report is "Aspirin grain V." A clinical term entry 60 is found on the first level 51 to match. The term entry 60 is mapped, or classified, to "Acetylsalicylic Acid" at the second level 52 clinical term entry 62. The entry 62 is further mapped to the third level 53 clinical term 64 "Aspirin." The last mapping 64 is the classification of the entry, and is referred to as the preferred term.

Figure 3B:
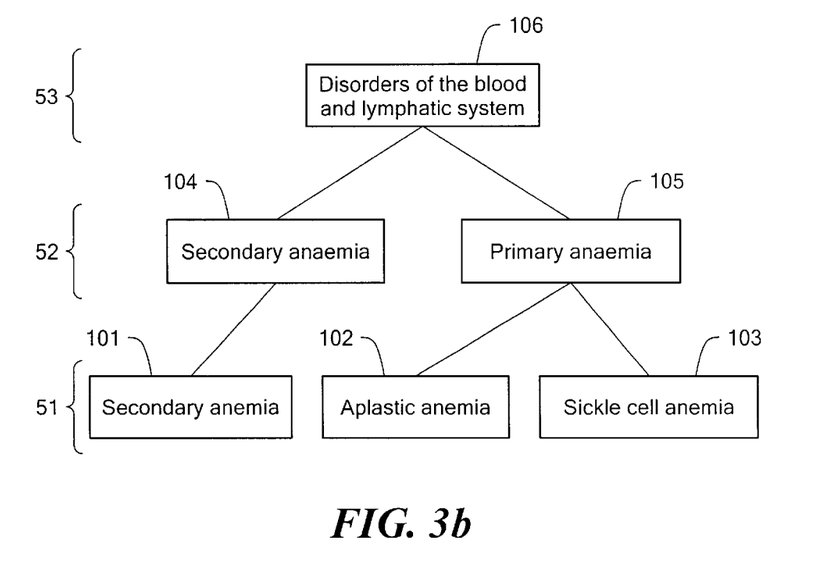
Figure 4A:
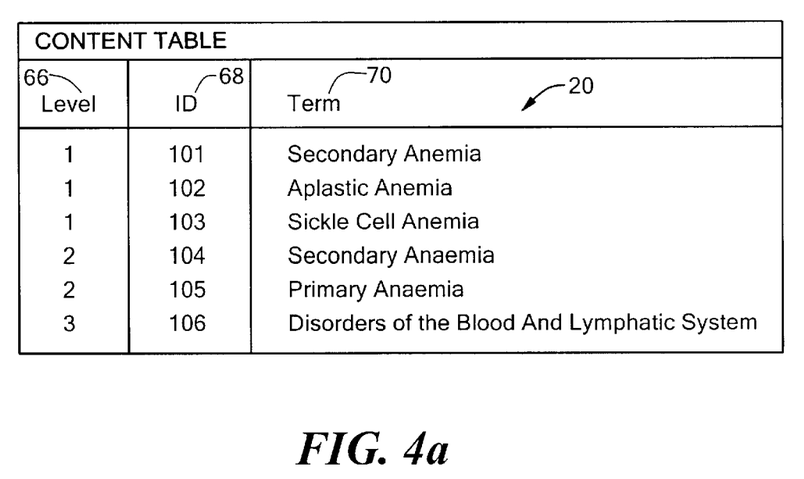
FIG. 4a is a diagram of the content table representing the hierarchy of terms of FIG. 3b.
Figure 4B:
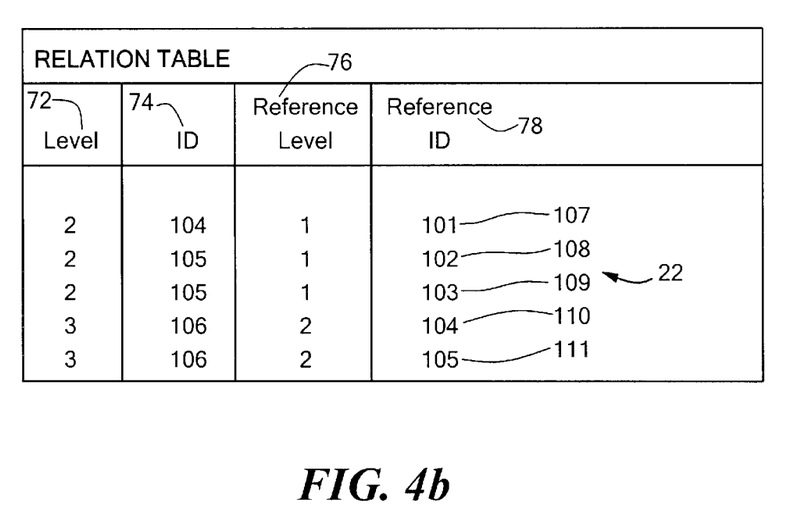
FIG. 4b shows the relation table representing the hierarchy of terms of FIG. 3b.

In the classification and mapping system, terms in a hierarchy shown in FIG. 3b are stored in the thesaurus database 18 as indicated in FIGS. 4a–4b. Referring to FIG. 3b, the content table as illustrated includes three entries. An ID field 68 identifies the entry within the table 20. A level field 66 indicates the hierarchy level of the entry. A term field 70 indicates the clinical term. The first level 51 clinical terms 101 "Secondary anemia" (ID=101), "Aplastic anemia" (ID=102), and "Sickle cell anemia" (ID=103) are stored in the content table 20 with the indicated ID field 68 entries. Similarly, second level 52 clinical terms "Secondary anaemia" (ID=104) and "Primary anaemia" (ID=105) are stored in the content table 20 with the indicated ID field 68 entries. Third level 53 entry "Disorders of the blood and lymphatic system" (ID=106) is stored in the content table 20 with the indicated ID field 68 entry. ID field 68 entries may, but need not be, unique across all hierarchy levels.

The relation table 22 corresponding to FIG. 3b is shown in more detail in FIG. 4b. For each relation, at least four entries are stored. An ID field 74 indicates the ID of the clinical term in the content table. A level field 72 indicates the level of the clinical term in then hierarchy. A reference ID field 78 indicates the ID of the associated clinical term in the content table. A reference level field 76 indicates the level of the associated clinical term defined by this relation. Specifically, the first record 107 in relation table 22 indicates that first level 51 entry "Secondary anemia" (ID=101) is associated with second level 52 entry "Secondary anaemia" (ID=104). The second record 108 indicates that first level 51 entry "Aplastic anemia" (ID=102) is associated with second level 52 entry "Primary anaemia" (ID=105). The third record 109 indicates that the first level 51 entry "Sickle cell anemia" (ID=103) is also associated with second level 52 entry "Primary anaemia" (ID=105). Finally, the final two records 110 and 111 in the relation table 22 indicate that second level 52 entries 104 and 105 both are associated with third level 53 entry "Disorders of the blood and lymphatic system" (ID=106). This organization allows classification of a clinical term in the thesaurus by traversing the relations to determine associated clinical terms, or derived terms.

Figure 5:
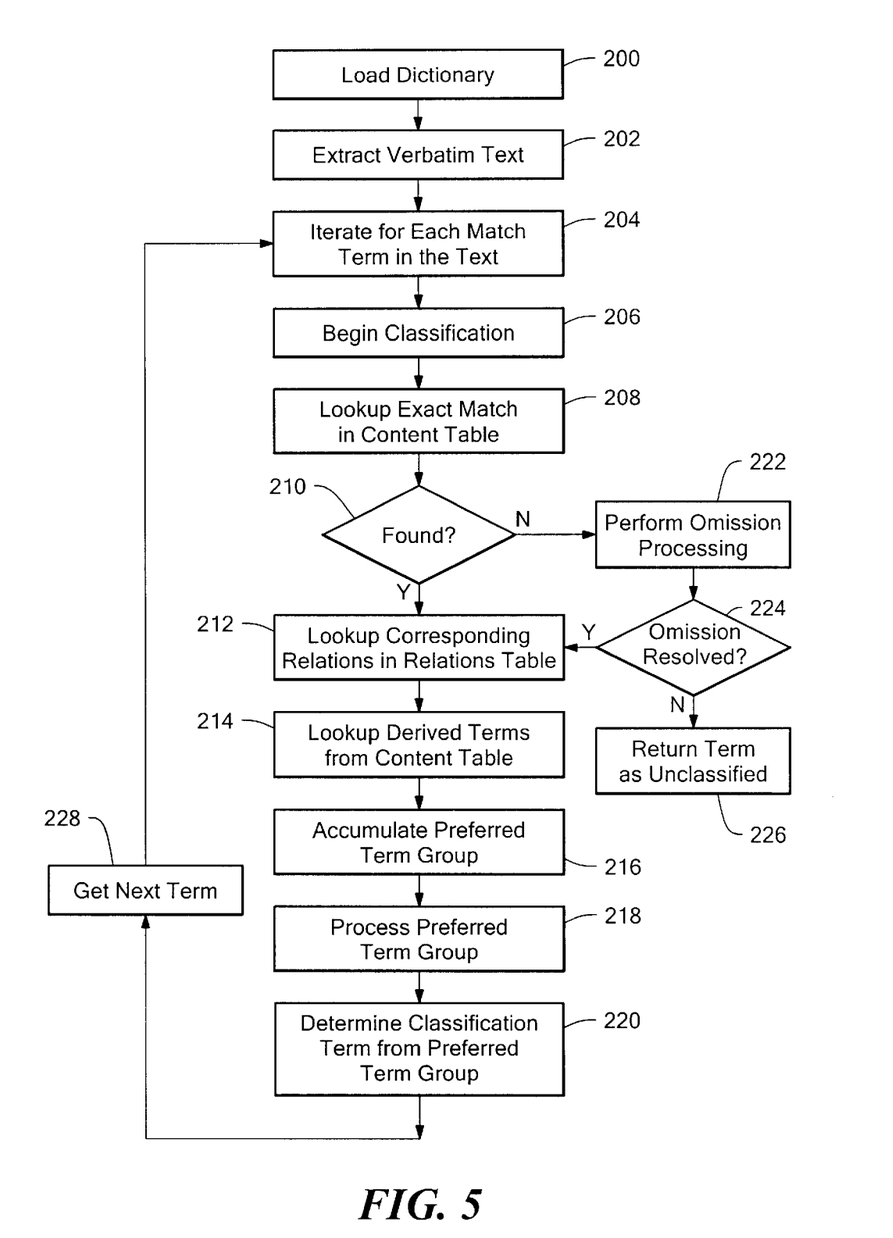
FIG. 5 shows a flowchart depicting classification of terms and resolution of omissions as described herein.

A flowchart of the classification and mapping method as defined herein is shown in FIG. 5. Referring to FIGS. 1 and 5, a dictionary of clinical terms is loaded into the thesaurus database 18 (FIG. 1) as depicted in step 200. The verbatim study terms 26 are extracted from the raw clinical text data to provide match terms, as shown in step 202.

An iteration for each match term in the text is established, as shown in step 204. For each match term, a classification as defined herein is begun, as depicted in step 206. A lookup is performed in the content table 20 to find the match term, as indicated in step 208. At step 210, a determination is made as to whether the match term was found in the thesaurus database 18. If a match is not found, the omission manager 24 is invoked to resolve the omission, as will be described further below.

If a match is found, a lookup in the relation table 22 is performed to find the relations corresponding to the found clinical term, as depicted in step 212. For each relation, a lookup is performed to find the corresponding derived terms in the content table 20, as shown in step 214. A preferred term group is accumulated from the derived terms, as depicted in step 216.

In a large hierarchy, the number of derived terms returned from traversing could be substantial. Factors affecting the accumulation of the preferred term group include more general classifications, more specific classifications, a target number of alternatives, a range of possible classifications, and other criteria, depending upon the type of classification output sought.

Using these and other criteria, the preferred term group is processed, as shown in step 218. A classification term to be employed as corresponding to the match term is determined, as depicted in step 220. In alternate embodiments, described further below, a discrete classification term cannot be determined, and further processing is performed. The next match term is retrieved, as shown in step 228, and control reverts to step 204.

Returning to step 210, if a match was not found, the omission manager is invoked to perform omission processing, as depicted at step 222. Omission processing is used when there is not an exact match between a clinical term in the thesaurus database 18 and a particular match term. The omission may be due to data entry errors, such as typos and spelling errors. It may also be due to a correct term that has not been entered as a clinical term in the thesaurus database 18. A correct term may not be entered in the database 18 because the dictionary initially loaded does not include the term or because the term is specific to a particular company or study, and not yet in published external dictionaries. The latter are referred to as company and domain terms, and will be described further below.

The omission manager employs a search module to search for a clinical term that corresponds to the match term. A search module searches the thesaurus database 18 looking for variant terms which are substantially similar to the match term, and aggregates a candidate term group. A variety of search techniques can be employed. From the candidate term group, a near fit variant term is sought. If the omission manager is able to resolve the omission by finding a near fit, as shown in step 224, the variant term will be returned as the matching clinical term and processing continues at step 212. If the omission manager is unable to resolve the omission, the match term is returned as unclassified, as depicted at step 226.

Figure 6:
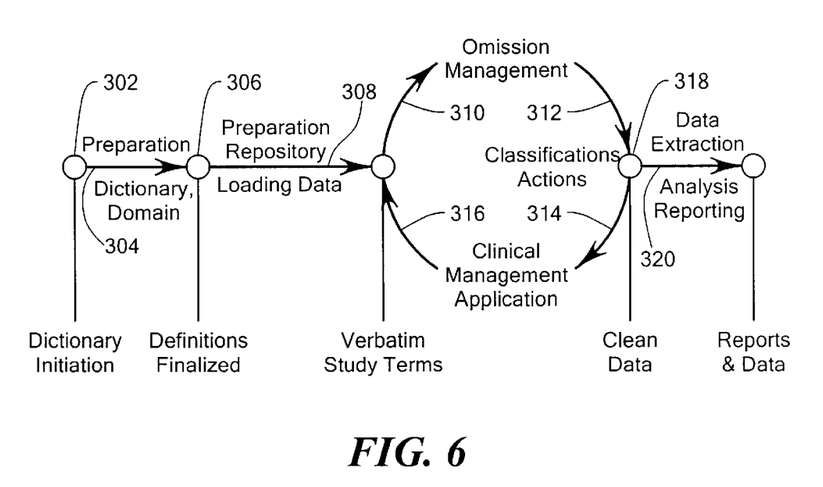
FIG. 6 shows a data flow of clinical data as described herein.

A dataflow diagram depicting the flow and processing of the clinical data in a typical study is shown in FIG. 6. Referring to FIG. 6, a study term classification dataflow is depicted. As described above with respect to FIG. 5, classification results in a classification term being returned as associated with the match term, as depicted at step 220. In an alternate embodiment, however, classification may not result in a single, discrete classification term but rather, may return a plurality of terms. Further processing and interaction is required to determine the proper clinical term from the thesaurus database.

Dictionary initiation begins at step 302 with an empty thesaurus database. Preparation includes loading the database with external dictionary terms from a vendor supplied dictionary, and domain terms. Domain terms are specific to a particular study, and are typically added by a user after the external dictionary terms are loaded. The dictionary and domain terms are finalized at step 306 after all the relations in the relation table 22 (FIG. 1) are stored to correspond to the clinical terms in the content table 20, as indicated by arrow 304. The dictionary terms are finalized and activated to assure compliance with the defined structure. Raw clinical data is loaded, and verbatim study terms are extracted, as indicated by preparation arrow 308. Each of the study terms is processed as a match term, first via omission management, shown by arrow 310 and corresponding to FIG. 5, steps 208, 210, 222, 224, and 226, and by classification actions, shown by arrow 312 and corresponding to FIG. 5, steps 212–220.

In one embodiment, a user may specify a set of rules to which the relations should conform. The activation process includes verifying each of the relations against the set of rules to assure compliance. The set of rules is indicative of the types of relations that are allowed in the database. Allowable relations defined by the set of rules include one to many, many to many, and inter-level relations. The allowable relations may define a hierarchy, graph, or other structure. Relations that do not conform to the allowable structure defined by the set of rules require modification before they may be activated and traversed in the thesaurus database.

As indicated above, omission management and classification may not determine an association for all match terms. The classification output may be in the form of a plurality of clinical terms. The classification output may be provided to a clinical data management application such as ORACLE® CLINICAL or another application, for further processing and interactive resolution, as shown by arrow 314. Such integration with a clinical data management application may be complete or partial, depending upon the level of automation required. For example, the classification output may be viewed by a user to interactively eliminate inapplicable clinical terms. Following processing by a clinical data management application, the refined, unclassified match terms reiterate through the classification process, as shown by arrow 316.

As match terms are properly classified at step 318, the data is extracted by the report/analysis engine (FIG. 1, 16), as shown by arrow 320. In this manner, an iterative dataflow is provided to effect classification of the verbatim study terms 26 to clinical terms in the thesaurus database 18.

Figure 7:
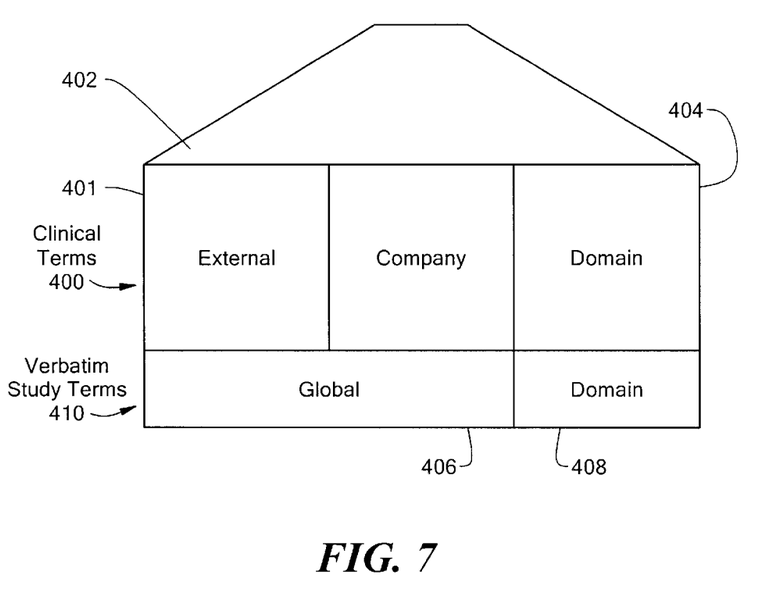
FIG. 7 shows the sources of clinical terms stored in the thesaurus database.

Often, a vendor supplied external dictionary does not contain all the terms required for proper classification of a particular study. For example, as indicated above, a corporation or enterprise may have internal terms not common to a published external dictionary. Similarly, an enterprise may employ proprietary terms in research concerning experimental and unreleased drugs. Because external dictionaries contain only published material, proprietary research terms would not be available. Referring to FIG. 7, there are several types of terms which may be stored in the thesaurus database 18 as clinical terms 400. External terms 402 are loaded from vendor supplied dictionaries, typically from a CD-ROM, and loaded at one time. Company terms 402 are those specific to a particular company or enterprise, and are added to the thesaurus database 18 as needed to support the classification processing. Domain terms 404 are attributed to a particular study, and contain unpublished terms specific to the study.

Once loaded, all terms are accessible through the thesaurus database for use in clinical term classification as defined herein. Similarly, the verbatim study terms 410 extracted from the raw clinical data are to be classified according to the clinical terms 401, 402, and 404. Common global study terms 406 are widely known and established, while domain study terms 408 are specific to a particular study.

Figure 8:
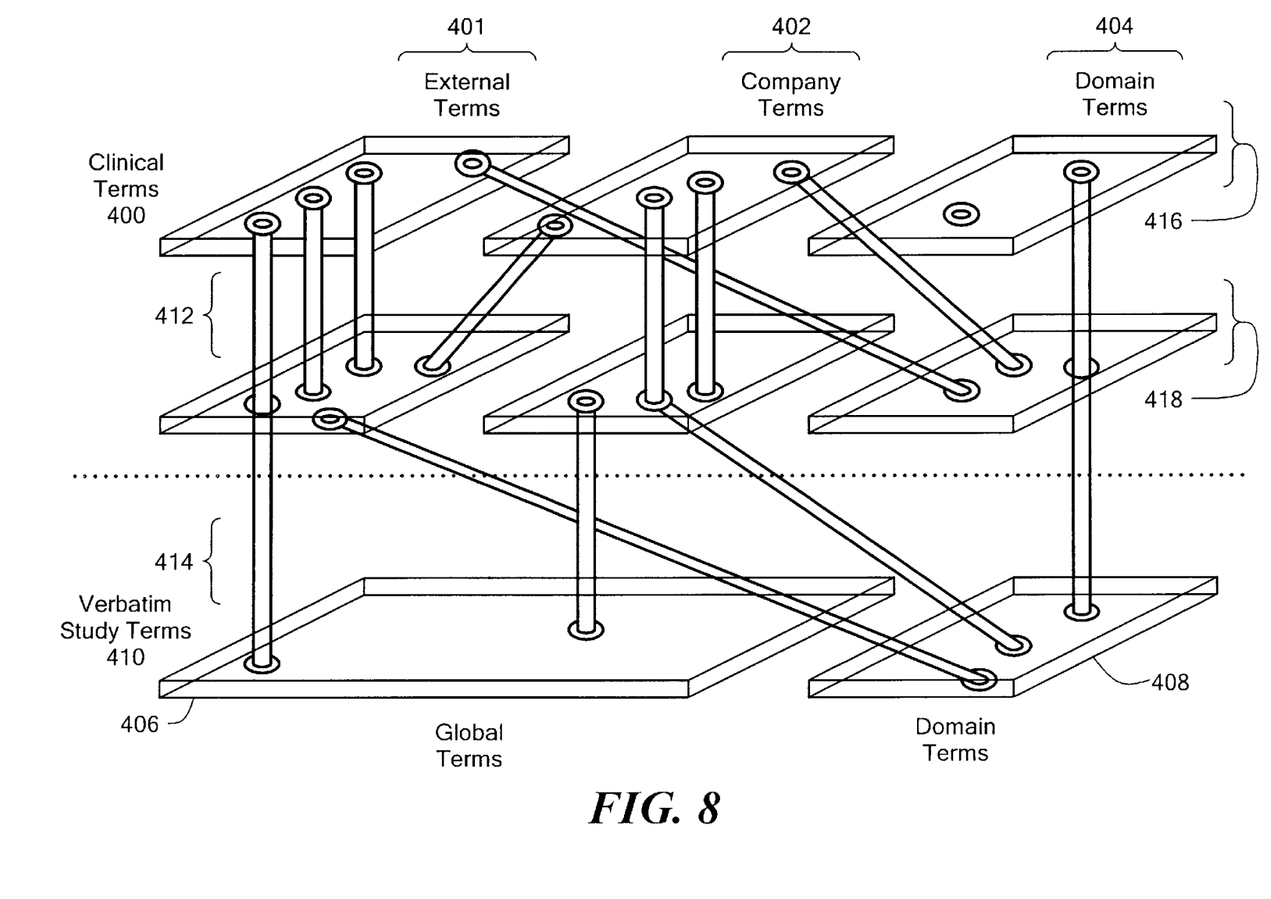
FIG. 8 shows the hierarchy of relations among terms of different sources.

The organization of the terms derived from the various sources is shown in FIG. 8. Referring to FIG. 8, the relations corresponding to external, company, and domain clinical terms are shown. The verbatim study terms 410 to be classified include global study terms 406 and domain study terms 408. The global and domain study terms 406, 408 correspond to the clinical terms 400 via matching lookups 414. The matching lookups 414 determine a corresponding external term 401, company term 402, or domain term 404 on a first hierarchy level 418. Clinical terms 400 on the first level 418 are mapped to corresponding clinical terms 400 on a second level 416 through the relations 412 defined in the relation table 22 (FIG. 4b). Note that the hierarchy is illustrated with two levels for clarification, however an arbitrary number of hierarchy levels are employed. Similarly, verbatim study terms need not all map to clinical terms on the same first level 418, but could be matched at any hierarchy level.

The terms and relations defined in the thesaurus database are often updated from one or more of the various sources of terms. These database updates may change the values of the clinical terms and the relations defined therein. Such updates transition the thesaurus database from one version, or state, to a successive version. It may, however, be desirable to revert from one database state to a previous database state. The clinical terms and relations in the thesaurus database may be associated with a state indicator indicative of a value at a discrete database state. Reference to the state indicator can provide recreation of a previous database state.

In a further embodiment, the state indicator may be a timestamp associated with each entry in the content table 20 and the relation table 22. The timestamp allows a period of validity to be associated with each clinical term in the content table 20 and with each relation in the relation table 22. As indicated above, the external dictionaries are often distributed in updated versions at periodic intervals, such as quarterly or yearly. Often clinical terms and relations are changed from version to version.

The use of a timestamp allows the period of validity to be specified for a particular term or relation. The timestamp therefore allows a virtual thesaurus database to be created at an arbitrary point in time by referencing the clinical terms and relations which are valid at that point in time.

Figure 9A:
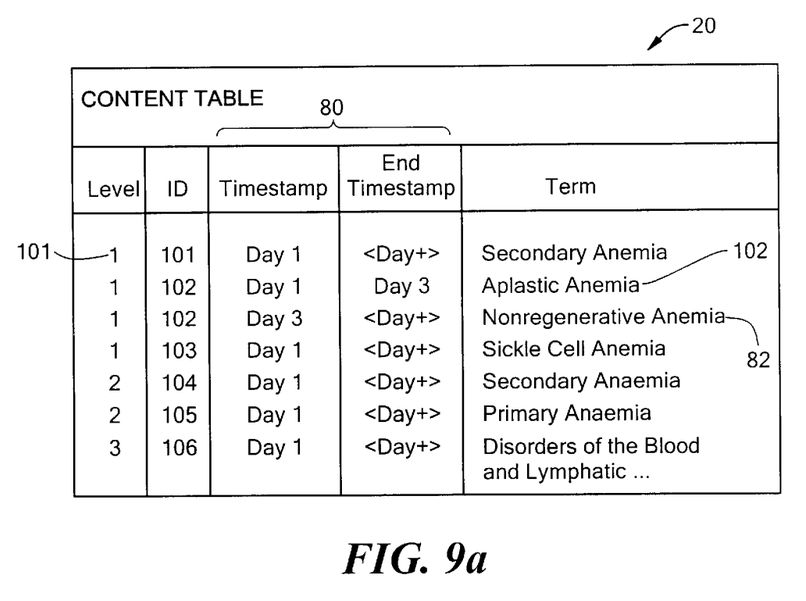
FIG. 9a shows the timestamp field used in a content table.
Figure 9B:
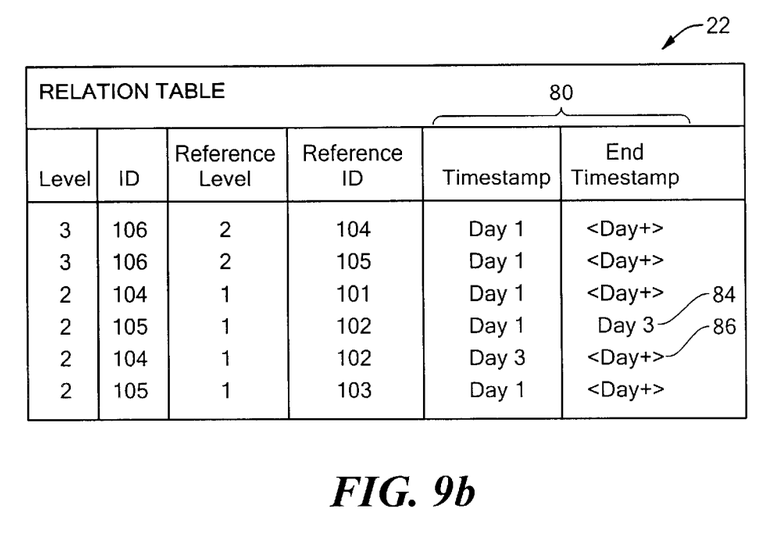
FIG. 9b shows the timestamp field used in a relation table.
Figure 10:
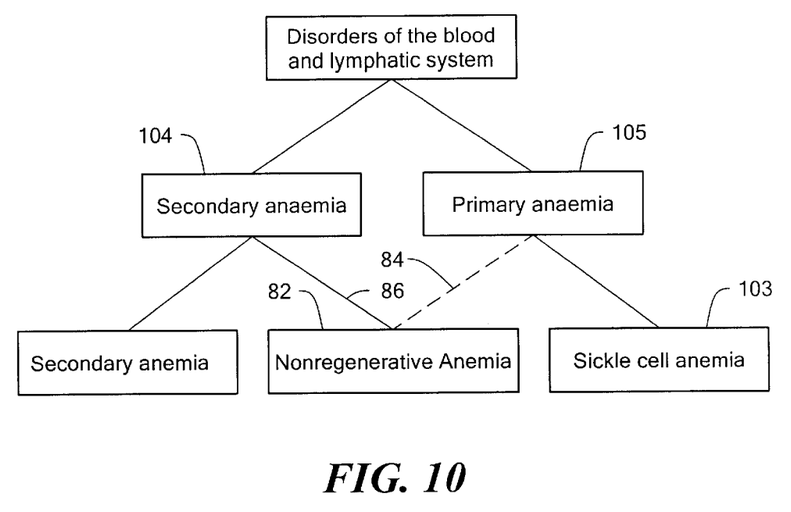
FIG. 10 shows the hierarchy represented by FIGS. 9a and 9b.

An example of a virtual database using the timestamp field is shown in FIGS. 9a, 9b, and 10. Referring to FIGS. 1, 9a, 9b, and 10, a content table 20, relation table 22, and a hierarchy corresponding to a change in the hierarchy of FIG. 3b are shown. The content table 20 and the relation table 22 have a timestamp field 80 associated with each entry. The timestamp 80 indicates a starting and an ending timestamp for each entry to define a period of validity.

In this example, the entry corresponding to "Aplastic anemia" (ID=102) is being changed to "Nonregenerative anemia" at day 3 of a study. Also at day 3, the entry for "Nonregenerative anemia" 82 is being reclassified from relation 84 "Primary anaemia" to correspond to "Secondary anaemia," as indicated by relation entry 86. Note that the timestamp value <Day+> indicates an indefinite period of validity. Therefore, "Aplastic anemia" 102 is valid from day 1 to day 3 of the study, and corresponds to the classification "Primary anaemia" 105. As of day 3, due to a new external dictionary version, for example, "Aplastic anaemia" is to be replaced with "Nonregenerative anemia." The entry for "Nonregenerative anemia" 82 is valid from Day 3 ongoing, and is now classified to correspond to "Secondary anaemia" 104, as indicated by the relation 86.

The example is given in whole days as a as a matter of clarification. The actual timestamp is as granular as the timekeeping functions in the classification server 10, typically specific to seconds or smaller intervals. In this manner, a virtual thesaurus database can be maintained at an arbitrary point in time to correspond to revised external dictionary versions or other factors.

Figure 11:
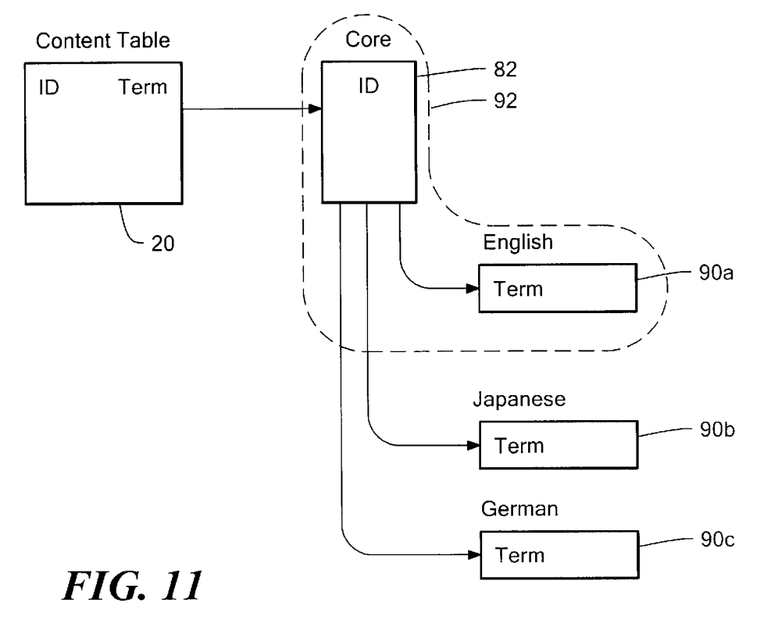
FIG. 11 shows a core used to map terms to foreign language equivalents.

In another preferred embodiment, shown in FIG. 11, foreign language support is provided. The ID field 68 of the content table 20 (FIG. 4a) is used to map into a core table 88. The core table maintains a mapping from each term ID into a plurality of foreign language tables 90a–90c. Each foreign language table maintains an equivalent term corresponding to the ID for the language supported. In the example provided, table 90a supports English terms, table 90b supports Japanese terms, and table 90c supports German terms. Other similar tables are provided to support other languages. The core table 88 is linked with the foreign language tables 90 to support the languages required. In the example described herein, the content table is linked with the English version table 90a, as indicated by the dotted line 92. In this manner a variety of languages are supported to allow analysis of raw clinical data from a plurality of languages.

Those skilled in the art should readily appreciate that the programs defining the operations and methods defined herein are deliverable to a computer in many forms, including but not limited to a) information permanently stored on non-writeable storage media such as ROM devices, b) information alterable stored on writeable storage media such as floppy disks, magnetic tapes, CDs, RAM devices, and other magnetic and optical media, or c) information conveyed to a computer through communication media, for example using baseband signaling or broadband signaling techniques, as in an electronic networks such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

While the classification and mapping system has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of storing a thesaurus of clinical terms comprising:
    defining a plurality of clinical terms for use in conjunction with a clinical study;
    storing the plurality clinical terms in a memory according to a hierarchy of relations; and
    defining a plurality of relations corresponding to the clinical terms, the relations indicative of an association from a clinical term to at least one other of the plurality of clinical terms.

2. The method of claim 1, further comprising:
    storing the relations in the memory;
    providing a match term;
    querying the memory to find an occurrence of the match term;
    traversing the relations corresponding to the match term; and
    accumulating at least one derived term from the relations corresponding to the match term.

3. The method of claim 2 wherein accumulating further comprising selecting at least one preferred term from the derived terms.

4. The method of claim 2 wherein querying further comprises:
    detecting an omission of the match term in the memory; and
    resolving the omission via searching for a variant term of the match term, wherein the variant term is substantially similar to the match term.

5. The method of claim 4 wherein resolving further comprises:
    aggregating a candidate term group; and
    selecting the variant term from the candidate term group.

6. The method of claim 5 wherein aggregating further comprises:
    invoking a search module; and
    traversing the memory to identify a near fit of the match term.

7. The method of claim 1 wherein the relations define a hierarchy of inter-level associations.

8. The method of claim 1 wherein each of the clinical terms further comprises a timestamp, wherein the timestamp is indicative of a period of validity of the clinical term.

9. The method of claim 8 further comprising adding a clinical term to the memory, wherein the added term has a timestamp indicative of a period of validity following a period of validity of another clinical term having a common relation.

10. The method of claim 1 wherein each of the relations further comprises a timestamp, wherein the timestamp is indicative of a period of validity of the relation.

11. The method of claim 10 further comprising:
    adding a relation to the memory, wherein the added relation has a first timestamp indicative of a first period of validity; and
    modifying a second timestamp of a relation indicative of a second period of validity, wherein the first period of validity and the second period of validity are distinct.

12. The method of claim 2 wherein providing a match term further comprises:
    scanning verbatim clinical data; and
    parsing verbatim study terms from the clinical data, wherein the verbatim study terms include the match terms.

13. The method of claim 12 wherein parsing further comprises:
    parsing common global study terms; and
    parsing domain study terms, wherein the domain study terms correspond to a predetermined study.

14. The method of claim 1 wherein defining the plurality of clinical terms further comprises:
    identifying external terms and generated terms, wherein the external terms are loaded into the memory at a predetermined time from a predetermined list and the generated terms are added at periodic intervals.

15. The method of claim 14 wherein the generated terms further comprise:
    enterprise terms corresponding to a company and domain terms corresponding to a predetermined study.

16. The method of claim 14 wherein the external terms are transmitted from an external media source.

17. The method of claim 16 wherein the external media source is a dictionary of clinical terms.

18. The method of claim 17 wherein the clinical terms comprise pharmaceutical names.

19. The method of claim 17 wherein the clinical terms comprise adverse events.

20. The method of claim 1 wherein the memory comprises an electronic thesaurus.

21. A method of maintaining and accessing a thesaurus of terms used in conjunction with a clinical study, comprising:
    identifying a plurality of clinical terms for the clinical study; storing the clinical terms in the thesaurus of terms according to a hierarchy of relations;
    defining a plurality of relations corresponding to the plurality of clinical terms, the relations indicative of an association from a term to at least one other of the plurality of clinical terms;
    storing the relations in the thesaurus of terms;
    receiving a match term;
    querying the thesaurus of terms to find an occurrence of the match term;
    traversing the relations corresponding to the match term; and
    accumulating at least one derived term from the relations corresponding to the match term.

22. A system for accessing a thesaurus of clinical terms used in conjunction with a clinical study comprising:
    a memory, the memory operable to store the clinical terms according to a hierarchy of relations for the clinical study;
    a content table included in the memory and having stored therein the clinical terms;
    a relation table included in the memory and having stored therein relations indicative of an association from a clinical term to at least one other of the clinical terms;

a classification server operable to traverse the relations and determine the clinical terms corresponding to each of the relations.

23. The system of claim 22 wherein the classification server further includes a classification and mapping processor operable to receive a match term and further operable to determine the existence of the match term in the memory.

24. The system of claim 23 wherein the classification and mapping processor is further operable to accumulate at least one derived term from the relations corresponding to the match term.

25. The system of claim 24 wherein the classification and mapping processor is further operable to select at least one preferred term from the derived terms.

26. The system of claim 25 wherein the classification server further comprises a report and analysis engine operable to receive the preferred term and employ the preferred term in a report.

27. The system of claim 23 wherein the classification and mapping processor further comprises an omission manager operable to determine the omission of the match term in the memory and further operable to identify at least one candidate term from among the clinical terms in the memory similar to the match term.

28. The system of claim 22 wherein the content table further includes a timestamp corresponding to each of the clinical terms, wherein the timestamp is indicative of a period of validity of the clinical term.

29. The system of claim 28 wherein a first record in the content table corresponds to a first clinical term for a first period of validity and a second record in the content table corresponds to a second clinical term for a second period of validity, wherein the first and second records correspond to a common relation.

30. The system of claim 22 wherein the relation table further includes a timestamp corresponding to each of the relations, wherein the timestamp is indicative of a period of validity of the relation.

31. The system of claim 30 wherein a relation corresponds to a first clinical term for a first period of validity and the relation corresponds to a second clinical term for a second period of validity.

32. The system of claim 22 wherein the relation table defines a hierarchy having a plurality of levels.

33. The system of claim 32 wherein the relations in the relation table are inter-level.

34. The system of claim 22 wherein the classification server further comprises an input device operable to receive the verbatim study terms.

35. The system of claim 34 wherein the input device is further operable to parse the verbatim study terms and yield match terms as a result of the parsing.

36. The system of claim 35 wherein the input device is further operable to receive the verbatim study terms from a plurality of data entry mediums.

37. The system of claim 36 wherein the data entry mediums are selected from the group consisting of a remote computer, a public access network, a scanner, a text entry device, and a software application.

38. The system of claim 35 wherein the match terms include common global terms and domain terms corresponding to a particular study.

39. The system of claim 22 wherein the content table is further adapted to store external terms and generated terms, wherein the external terms are loaded from a predetermined list and the generated terms are added to the memory at periodic intervals.

40. The system of claim 39 wherein the generated terms further comprise enterprise terms corresponding to a company and domain terms corresponding to a predetermined study.

41. The system of claim 39 further comprising a loader operable to write the content table and the relation table to the memory from the predetermined list.

42. The system of claim 41 wherein the predetermined list is an external media source.

43. The system of claim 42 wherein the external media source is a medical dictionary.

44. A method of storing a thesaurus of terms in a database comprising:

defining a plurality of terms for a clinical study;

storing the plurality of terms according to a hierarchy of relations;

defining a plurality of relations corresponding to the plurality of terms, the relations indicative of an association from a clinical term to at least one other of the plurality of terms, each of the plurality of relations satisfying one or more rules defined by a user of the database.

45. The system of claim 44 wherein the plurality terms and the plurality of relations define a hierarchy.

46. The method of claim 44 wherein the plurality terms plurality of relations define a cyclic graph.

47. The method of claim 44 wherein one of said rules allow for a one to many association.

48. The method of claim 44 wherein the plurality of relations are many to many.

49. The method of claim 45 wherein the hierarchy defines a plurality of levels.

50. The method of claim 49 wherein the relations correspond from one of the plurality of levels to another distinct level.

51. A method of storing a thesaurus of terms in a database comprising:

defining a plurality of terms for a clinical study;

storing the plurality of terms in a memory according to a hierarchy of relations;

defining a plurality of relations corresponding to the plurality of terms, the relations indicative of an association from a clinical term to at least one other of the plurality of terms;

determining, for each of the relations, whether each of the relations satisfies one or more user defined rules; and activating the plurality of user defined rules based on the determining.

52. The method of claim 51 wherein the activating further comprises comparing each of the plurality of relations to each of the rules in the set of rules.

53. A method of storing a thesaurus of terms comprising:

defining a plurality of terms for a clinical study;

storing the plurality of terms in a memory according to a hierarchy of relations;

defining a plurality of relations corresponding to the plurality of terms, the relations indicative of an association from a clinical term to at least one other of the plurality of terms; and defining a database state of the plurality of relations and the plurality of terms, wherein the database state is indicative of a discrete value of each of the relations and the terms.

54. The method of claim 53 further comprising the steps of
    providing a plurality of database updates, wherein the database updates and the plurality of terms and the plurality of relations define a successive database state.

55. The method of claim 54 wherein the successive database state is indicative of a discrete value of each of the relations and the terms.

56. The method of claim 55 further comprising a plurality of successive database states defining a sequence of database states.

57. The method of claim 56 further comprising the steps of reverting the database state to a previous database state as defined by the sequence of database states.

58. A computer program product including a computer readable medium having computer program code for storing and accessing a thesaurus of clinical terms comprising:
    computer program code for providing a plurality of clinical terms for use in connection with a clinical study;
    computer program code for storing the plurality of terms in a memory according to a hierarchy of relations;
    computer program code for defining a plurality of relations corresponding to the plurality of clinical terms, the relations indicative of an association from a clinical term to at least one other of the plurality of clinical terms.

59. The computer program product of claim 58, further comprising:
    computer program code for storing the relations in the memory;
    computer program code for providing a match term;
    computer program code for querying the memory to find an occurrence of the match term;
    computer program code for traversing the relations corresponding to the match term; and
    computer program code for accumulating at least one derived term from the relations corresponding to the match term.

60. A system for storing and accessing a thesaurus of clinical terms comprising:
    means for providing a plurality of clinical terms for a clinical study;
    means for storing the clinical terms in a memory according to a hierarchy of relations; and
    means for defining a plurality of relations corresponding to the plurality of clinical terms, the relations indicative of an association from a clinical term to at least one other of the plurality of clinical terms.

61. The system of claim 60, further comprising:
    means for storing the relations in the memory;
    means for providing a match term;
    means for querying the memory to find an occurrence of the match term;
    means for traversing the relations corresponding to the match term; and
    means for accumulating at least one derived term from the relations corresponding to the match term.

62. A computer data signal including program code for storing and accessing a thesaurus of clinical terms comprising:
    program code for providing a plurality of clinical terms for a clinical study;
    program code for storing the plurality of clinical terms in a memory, according to a hierarchy of relations; and
    program code for defining a plurality of relations corresponding to the plurality of clinical terms, the relations indicative of an association from a clinical term to at least one other of the plurality of clinical terms.

63. The computer data signal of claim 62, further comprising:
    program code for storing the relations in the memory;
    program code for providing a match term;
    program code for querying the memory to find an occurrence of the match term;
    program code for traversing the relations corresponding to the match term; and
    program code for accumulating at least one derived term from the relations.

64. The method of claim 7 wherein the hierarchy is indicative of a progression from general to specific terms.

65. The system of claim 32 wherein the hierarchy is indicative of a progression from general to specific terms.

\* \* \* \* \*